(12) United States Patent
Arrabi et al.

(10) Patent No.: US 11,527,033 B2
(45) Date of Patent: Dec. 13, 2022

(54) TESSELLATOR SUB-PATCH DISTRIBUTION BASED ON GROUP LIMITS

(71) Applicant: ADVANCED MICRO DEVICES, INC., Santa Clara, CA (US)

(72) Inventors: Saad Arrabi, Orlando, FL (US); Vishrut Vaibhav, Orlando, FL (US); Mangesh P. Nijasure, Orlando, FL (US); Todd Martin, Orlando, FL (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/825,600

(22) Filed: Mar. 20, 2020

(65) Prior Publication Data
US 2021/0295585 A1 Sep. 23, 2021

(51) Int. Cl.
*G06T 15/00* (2011.01)
(52) U.S. Cl.
CPC .................................. *G06T 15/005* (2013.01)
(58) Field of Classification Search
CPC .............................. G06T 15/005; G06T 15/503
See application file for complete search history.

(56) References Cited

U.S. PATENT DOCUMENTS

| | | | |
|---|---|---|---|
| 2014/0152675 A1* | 6/2014 | Martin | G09G 5/363 345/506 |
| 2014/0267258 A1* | 9/2014 | Yang | G06T 15/405 345/422 |
| 2014/0267259 A1* | 9/2014 | Frascati | G06T 15/005 345/423 |
| 2016/0071317 A1* | 3/2016 | Kim | G06T 17/20 345/423 |
| 2018/0308285 A1* | 10/2018 | Doyle | G06T 15/005 |

* cited by examiner

*Primary Examiner* — Michelle Chin

(57) ABSTRACT

A graphics pipeline includes a tessellator stage having a sub-patch distributor and a plurality of tessellators. The sub-patch distributor divides an input patch into a plurality of sub-primitive groups, with the primitive group limit governing the maximum permissible size for a given group of sub-primitives to be assigned to a tessellator. The sub-patch distributor recursively identifies a plurality of regions of the input patch, with the size and number of primitives of each region based on the specified primitive group limit. The sub-patch distributor assigns different regions to different sub-patch groups and distributes the sub-patch groups among the plurality of tessellators.

27 Claims, 8 Drawing Sheets ered by the graphics driver, to indicate a maximum number of primitives that may be included in a sub-patch group. The tessellation stage 108 includes a sub-patch distributor 110 and a plurality of tessellators (e.g., tessellators 112, 113, and 114). The sub-patch distributor 110 divides an input patch into a plurality of sub-primitive groups (also referred to herein as sub-patch groups), with the primitive group limit governing the maximum permissible size for a given group of sub-primitives to be assigned to a tessellator. Thus, for example, the sub-patch distributor 110 recursively identifies a plurality of regions of the input patch, with the size and number of primitives of each region based on the specified primitive group limit. The sub-patch distributor 110 assigns different regions to different sub-patch groups and distributes the sub-patch groups to different ones of the plurality of tessellators. By recursively sizing the identified regions based on the primitive group limit, the sub-patch distributor 110 distributes sub-patches, and corresponding primitives, to the different tessellators in a relatively even fashion, which in turn loads the tessellators relatively equally and thereby improves overall efficiency of the GPU.

TESSELLATOR SUB-PATCH DISTRIBUTION BASED ON GROUP LIMITS

BACKGROUND

A graphics processing unit (GPU) typically implements multiple processor cores that pipeline instructions or concurrently execute instructions for one or more workloads. The processor cores in a GPU often process three-dimensional (3-D) graphics and other image content using a graphics pipeline implementing a sequence of programmable shaders and fixed-function hardware blocks. For example, a 3-D model of an object that is visible in a frame is represented by a set of primitives such as triangles, other polygons, or patches of one or more triangles or other polygons, which are processed in the graphics pipeline to produce values of pixels of an image frame that is then provided for display to a user. In many cases, the graphics pipeline includes a dedicated tessellation stage to tessellate the primitives, thereby increasing the level of detail of the object for subsequent operations such as texturing. The tessellation stage includes multiple individual tessellators and a workload distributor to distribute sub-patches of an input patch corresponding to a portion of the input object among the multiple tessellators. However, conventional workload distributors distribute the sub-patches inefficiently, thereby reducing the overall efficiency of the graphics pipeline.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
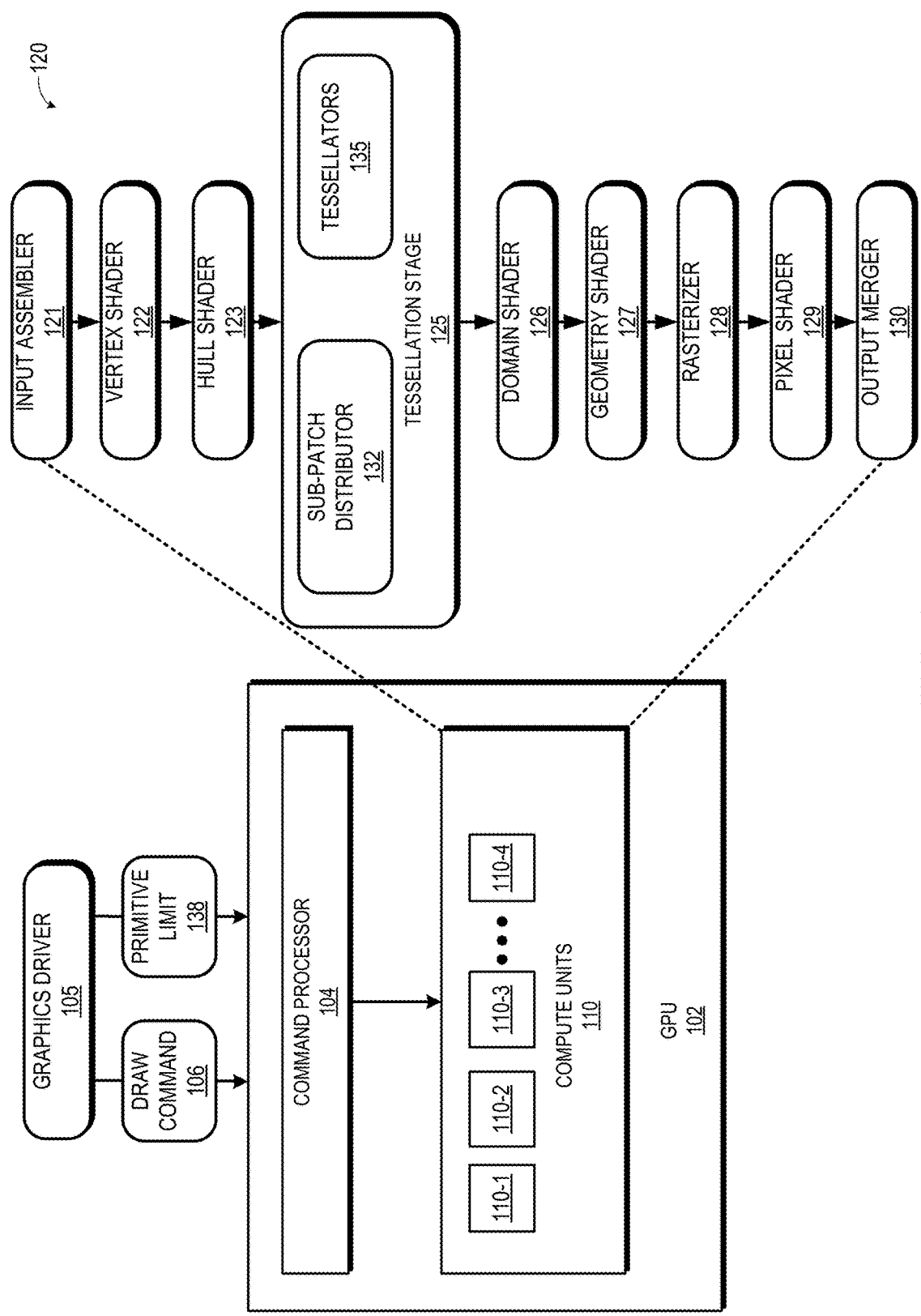
FIG. 1 is a block diagram of a GPU having a tessellation stage that includes a sub-patch distributor that distributes primitives among a set of tessellators based on a specified primitive group limit in accordance with some embodiments.

FIGS. 1-10 illustrate systems and techniques for distributing sub-patches of an input patch among a set of tessellators of a GPU based upon a specified primitive group limit specified by, for example, a graphics driver for the GPU. The graphics pipeline includes a tessellator stage having a sub-patch distributor and a plurality of tessellators. The sub-patch distributor divides an input patch into a plurality of sub-primitive groups, with the primitive group limit governing the maximum permissible size for a given group of sub-primitives to be assigned to a tessellator. Thus, for example, the sub-patch distributor recursively identifies a plurality of regions of the input patch, with the size and number of primitives of each region based on the specified primitive group limit. The sub-patch distributor assigns different regions to different sub-patch groups and distributes the sub-patch groups to different ones of the plurality of tessellators. By recursively sizing the identified regions based on the primitive group limit, the sub-patch distributor distributes sub-patches, and corresponding primitives, to the different tessellators in a relatively even fashion, which in turn loads the tessellators relatively equally and thereby improves overall efficiency of the GPU.

To illustrate, a conventional sub-patch distributor typically assigns different sub-patches to different tessellators based on the relative location of the different sub-patches in a specified pattern applied to the input patch. However, because the number of vertices of a patch are unevenly distributed among different locations of the patch, with outer portions of a patch having more vertices than inner portions, the tessellation workload for a given patch is distributed in a relatively uneven fashion in a conventional system. For example, a conventional approach to tessellation distribution is to divide the input patch into a set of concentric rings surrounding a center of the input patch, and to assign each tessellator a sub-patch from a corresponding location of each ring. However, because the inner rings of the concentric set of rings have fewer points that the outer rings, the tessellators that are assigned sub-patches from the inner rings perform fewer overall operations than the tessellators that are assigned sub-patches from the outer rings. The effect of these different number of operations is that the tessellators assigned sub-patches from the inner rings experience idle periods where no useful work is performed as the tessellators await completion of operations by the tessellators assigned to the outer rings.

In contrast to such conventional approaches, the techniques described herein recursively group sub-patches of the input patch such that each group includes a number of primitives that substantially matches the specified group primitive limit. The resulting groups therefore include the same or a similar number of primitives, allowing the sub-patch distributor to distribute the tessellation operations more evenly among the tessellators, and thus improving overall GPU efficiency.

FIG. 1 illustrates a block diagram of GPU 102 that implements sub-patch distribution based on a specified group primitive limit in accordance with some embodiments. The GPU 102 is a processing unit designed to execute graphics operations, vector processing operations, and the like on behalf of a processing system incorporated in an electronic device, such as a desktop computer, laptop computer, server, smartphone, game console, tablet, automobile, and the like. In some embodiments, the processing system including the GPU 102 also includes additional components not illustrated at FIG. 1, such as one or more central processing units (CPUs), memory modules, input/output interfaces, and the like.

To support execution of graphics operations, the GPU 102 includes a command processor (CP) 104 and a set of compute units 110. The CP 104 includes circuitry to receive commands (e.g., draw command 106) from, for example, a graphics driver 105 executing at another processing unit, such as a CPU. The received commands delineate the operations to be executed by the GPU 102 and the data to be used to execute the operations. For example, in some embodiments the draw command 106 delineates an object and indicates how the GPU 102 is to generate, or "draw", a representation of the object in a frame for display. Based on the received commands, the CP 104 generates sets of operations, sometimes referred to as wavefronts or warps, to be executed at the set of compute units 110.

The set of compute units 110 includes a plurality of compute units, including compute units 110-1, 110-2, 110-3, and 110-4. Although four compute units are shown in FIG. 1 in the interest of clarity, some embodiments of the GPU 102 include additional compute units. Each of the set of compute units 110 includes a plurality of single instruction multiple data (SIMD) units to execute multiple wavefront operations in parallel. For example, the SIMD units of a given compute unit perform similar operations, such as vector operations, on different data elements, such as different elements of a vector or array.

For some wavefronts, the set of compute units 110 together implement a graphics pipeline 120 having a plurality of stages, with each stage implementing a corresponding set of operations associated with the stage as described further below. Thus, a stage of the graphics pipeline 120 represents a corresponding set of operations executed at one or more compute units of the set of compute units 110. In different embodiments, operations associated with different stages of the graphics pipeline 120 are implemented at the same or overlapping subsets of the compute units 110. Thus, for example, in some embodiments a given compute unit carries out, at different times, operations for the vertex shader stage 122 and the geometry shader stage 127.

It will be appreciated that in some embodiments the graphics pipeline 120 includes additional resources not illustrated at FIG. 1. For example, in some embodiments the graphics pipeline 120 includes a shader pool, which is a memory resource that stores data for the graphics pipeline 120, and allows each stage of the graphics pipeline 120 to pass data to any other stage for processing.

In some embodiments, the graphics driver 105 delineates, via the draw command 106 or other command, an application program interface (API) to be implemented by the graphics pipeline 120, such as a DirectX® API (e.g., the DirectX 12 API)), the OpenGL API, and the like. The API and associated libraries govern the operations of at least some of the different stages of the graphics pipeline 120 by defining, in some cases, the inputs, outputs, and graphical processes of the different stages. In some embodiments the API defines the particular shading process implemented at a corresponding stage, the format of the input expected by the stage, the format of the output generated by the stage, and the like.

Turning to the individual stages, the graphics pipeline 120 includes an input assembler 202 that is configured to access object information from the storage resources (not shown) that is used to define an object to be drawn as requested by, for example, the draw command 106. The object information delineates characteristics of the object to be drawn, such as the type and arrangement of primitives and vertices that compose the object. A vertex shader 122 stage receives vertices of a primitive as input and outputs a corresponding vertices based on vertex shading process defined by the API. Some embodiments of shaders such as the vertex shader 122 implement single-instruction-multiple-data (SIMD) processing so that multiple vertices are processed concurrently, e.g., by the compute units 111-114 shown in FIG. 1.

A hull shader 123 operates on input high-order patches or control points of the object to be drawn that are used to define the input patches. The hull shader 123 outputs tessellation factors and other patch data according to a hull shader process defined by the API. Patches generated by the hull shader 123 are provided to a tessellation stage 125 which generates information identifying primitives corresponding to the input object, e.g., by tessellating the input objects based on tessellation factors provided to the tessellation stage 125 by the hull shader 123. Tessellation subdivides input higher-order primitives such as patches into a set of lower-order output primitives that represent finer levels of detail, e.g., as indicated by tessellation factors that specify the granularity of the primitives produced by the tessellation process. A model of a scene is therefore represented by a smaller number of higher-order primitives (to save memory or bandwidth) and additional details are added by tessellating the higher-order primitive.

A domain shader 126 receives a domain location and (optionally) other patch data from the tessellation stage 125. The domain shader 126 operates on the provided information to generate vertices for output based on the input domain location and other information. A geometry shader 127 receives an input primitive and generates up to four primitives based on the input primitive. The stream of primitives is provided to a rasterizer 128 that performs shading operations and other operations such as clipping, perspective dividing, scissoring, and viewport selection, and the like, based on the operations delineated by the draw command 106. A pixel shader 129 inputs a pixel flow generated by the rasterizer 128 and outputs zero or another pixel flow in response to the input pixel flow. An output merger 130 performs blend, depth, stencil, and other operations on pixels received from the pixel shader 129 based on the operations delineated by the draw command 106.

Returning to the tessellator stage 125, to implement tessellation the stage includes a sub-patch distributor 132 and tessellators 135. The tessellators 135 represents a plurality of tessellators, with each tessellator implementing a tessellation process for a received set of points and vertices (a patch), wherein the tessellation process is defined by the API associated with the graphics driver 105. To enhance processing efficiency, the sub-patch distributor 132 divides a received input patch into a plurality of sub-patch groups based on a specified primitive group limit, designated primitive limit 138. In the depicted embodiment, the primitive limit 138 is a parameter whose value is supplied by the graphics driver 105, allowing the driver programmer to adjust the limit based on the particular implementation of the GPU 102, the program issuing the draw command 106, and the like.

In some embodiments, the sub-patch distributor 132 divides the primitives of the input patch into sub-patch groups by applying a recursive process to identify a plurality of regions of the input patch, so that each region includes, as closely as possible, the number of primitives indicated by the specified primitive limit 138. For example, in some embodiments the sub-patch distributor 132 first identifies N regions of the input patch, where each of the N regions includes the number of primitives that 1) is able to be evenly distributed among the identified regions; and 2) does not exceed the specified primitive limit 138. The sub-patch distributor 132 places the primitives of each identified region of the N regions in a sub-patch group and provides each sub-patch group to a different one of the tessellators 135 for tessellation.

The sub-patch distributor 132 then identifies the area of the received input patch that includes the primitives not yet placed in a sub-patch group. The sub-patch distributor 132 identifies M regions of the identified area, where each of the M regions includes, analogously to the N regions, the number of primitives that 1) is able to be evenly distributed among the identified regions; and 2) does not exceed the specified primitive limit 138. As with the N regions described above, the sub-patch distributor 132 then places the primitives of each identified region of the M regions in a sub-patch group and provides each sub-patch group to a different one of the tessellators 135 for tessellation. The sub-patch distributor 132 continues to recursively identify regions for the remaining primitives of the input patch, in similar fashion to that described above, until all primitives of the input patch have been placed in sub-patch groups and provided to the tessellators 135. By identifying sub-patches of the input patch based on regions having the same number of primitives, the sub-patch distributor 132 distributes the tessellation workload for a given input patch more evenly over the tessellators 135, relative to conventional approaches that distribute the workload based on the relative location of primitives within the patch. The more even distribution of the workload reduces the amount of time that the tessellators 135 are idle, thereby improving the overall efficiency of the GPU 102.

Figure 2:
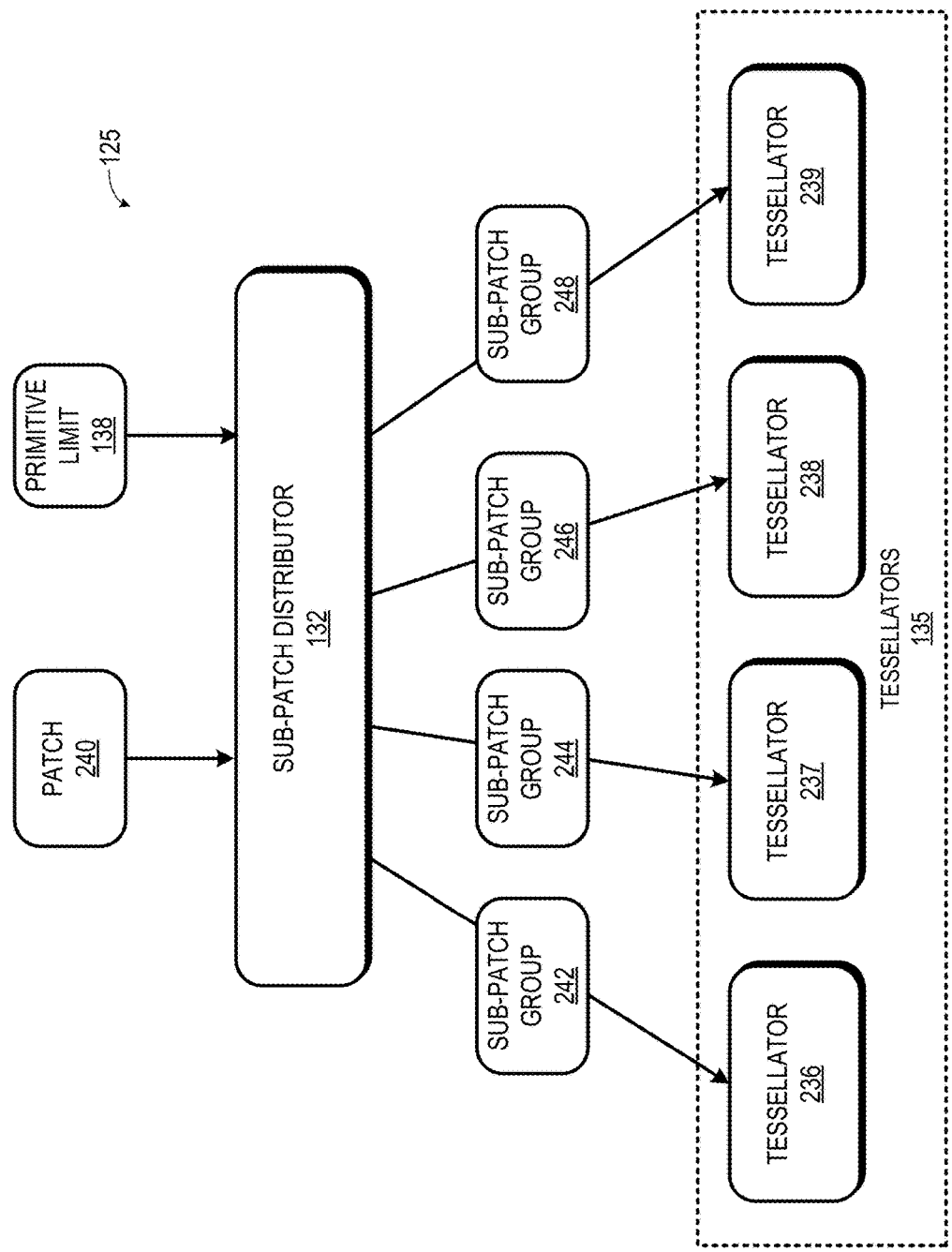
FIG. 2 is a block diagram illustrating an example of the sub-patch distributor of FIG. 1 distributing primitives among the set of tessellators in accordance with some embodiments.

FIG. 2 illustrates an example of the sub-patch distributor 132 dividing a received input patch 240 into a plurality of sub-patch groups and distributing the sub-patch groups in accordance with some embodiments. In the illustrated example, the sub-patch distributor 132 divides the input patch 240 into a plurality of different sub-patch groups 242, 244, 246, 248. Each sub-patch group includes a subset of points and vertices for a different region of the patch 240, as described further below. The tessellators 135 includes four tessellators 236, 237, 238 and 239, and the sub-patch distributor 132 sends a different one of the sub-patch groups 242, 244, 246, and 248 to a corresponding one of the tessellators 236-239. Thus, for example, the sub-patch distributor 132 sends the sub-patch group 242 to the tessellator 236, the sub-patch group 244 to the tessellator 237, the sub-patch group 246 to the tessellator 238, and the sub-patch group 248 to the tessellator 239. It will be appreciated that in some embodiments, and for some patches, a given tessellator is assigned multiple sub-patch groups from the same received input patch. Each of the tessellators 236-239 tessellates the received group of sub-patches according to the tessellation factors received from the hull shader 123 and using the tessellation process defined by the API associated with the graphics driver 105. The tessellators 236-239 store the resulting tessellated patch at a buffer (not shown) for use by other stages of the graphics pipeline 120.

Figure 3:
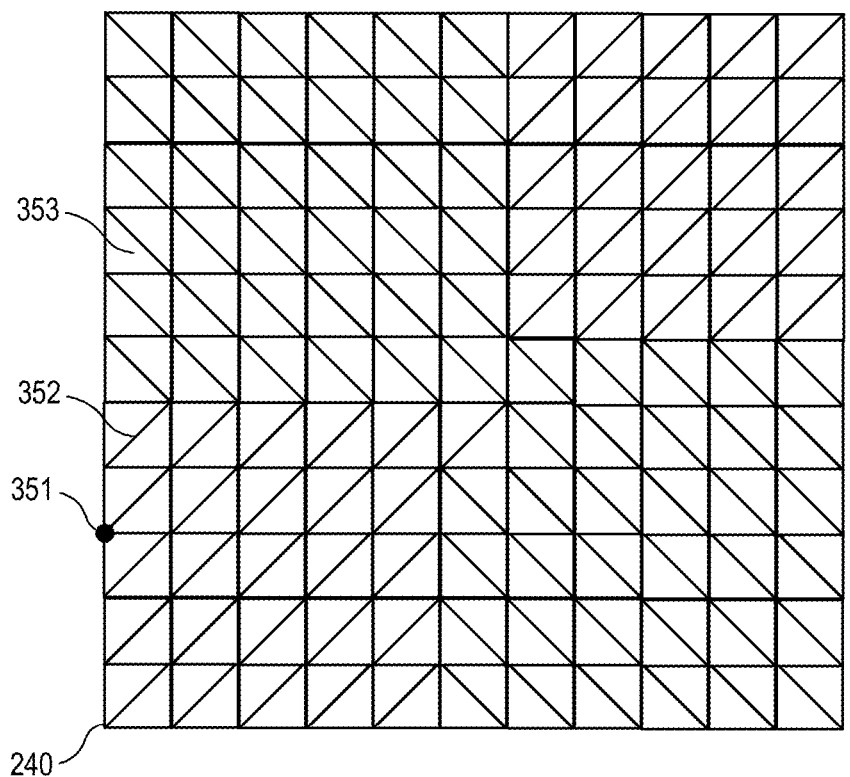
FIG. 3 is a diagram illustrating an example of an input patch received at a tessellation stage of the GPU of FIG. 1 in accordance with some embodiments.

In some embodiments, the sub-patch distributor 132 divides the patch 240 into sub-patch groups in two stages: an edge primitive stage, wherein the sub-patch distributor 132 groups edge primitives of the patch 240 into different sub-patch groups for tessellation, and an internal primitive stage, wherein the sub-patch distributor groups internal primitives of the patch 240 into different sub-patch groups for tessellation. To illustrate, FIG. 3 illustrates an example of the patch 240 in accordance with some embodiments. The patch 240 includes a plurality of vertices (e.g., vertex 351, enlarged relative to other vertices of the patch 240 for illustration), line segments connecting the vertices (e.g., line segment 352), wherein the arrangement of points and connecting line segments form primitives (e.g., primitive 353). In the depicted example, the primitives that compose the patch 240 are triangles. In other embodiments, the primitives are another shape, such as a quadrilateral or other polygon, or any combination thereof.

Figure 4:
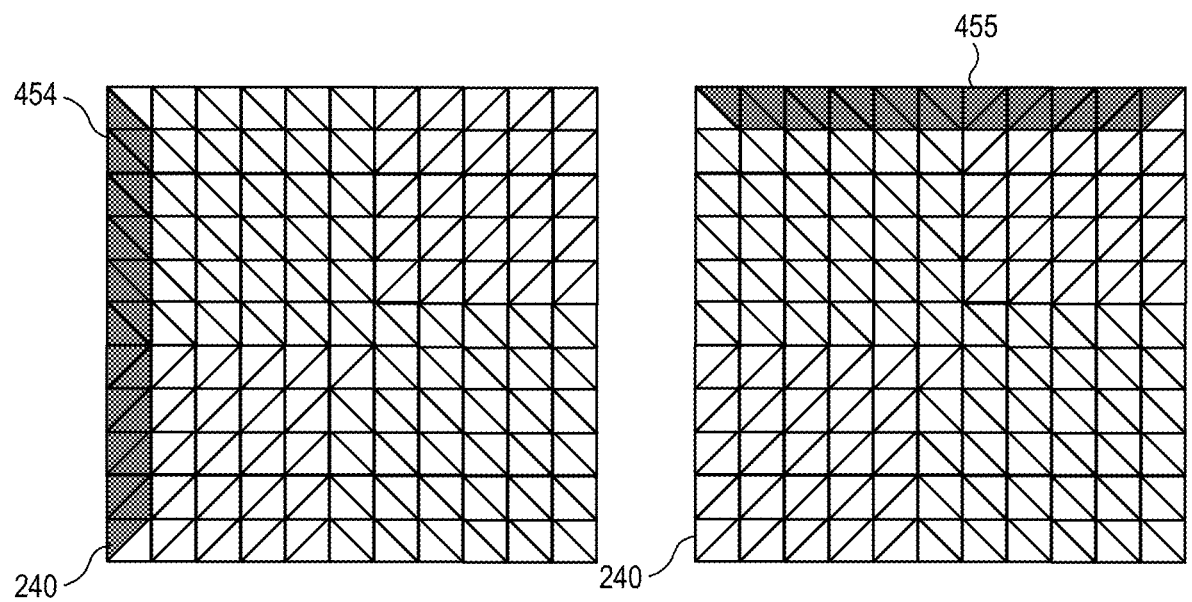
FIG. 4 is a diagram illustrating example edge primitives of the input patch of FIG. 3 in accordance with some embodiments.
Figure 5:
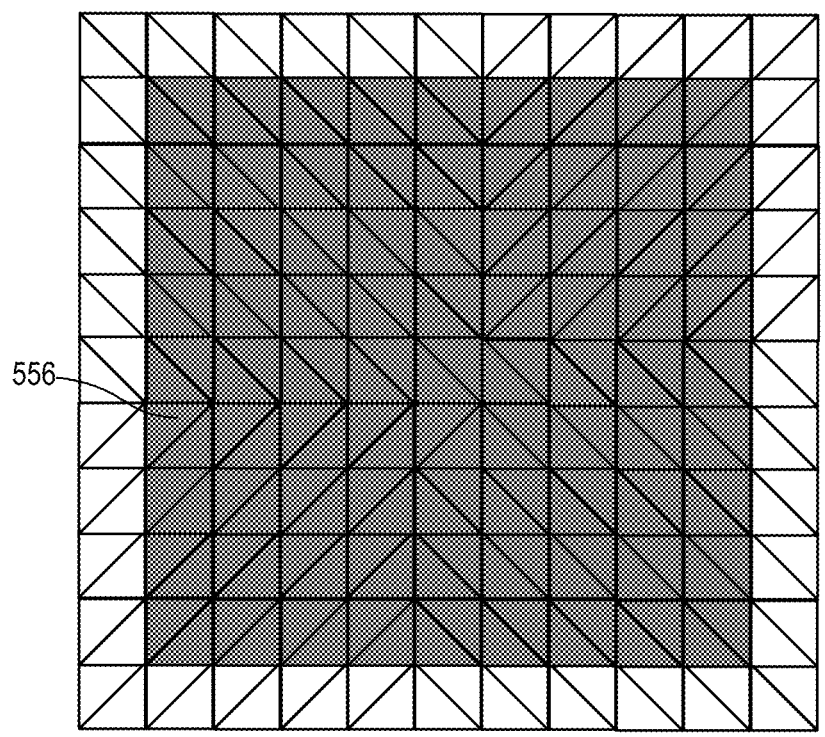
FIG. 5 is a diagram illustrating internal primitives of the input patch of FIG. 3 in accordance with some embodiments.

The patch 240 includes two general types of primitive, classified according to their location in the patch 240: edge primitives and internal primitives. Edge primitives are primitives located along an edge of the patch 240. Example edge primitives for the patch 240 are illustrated at FIG. 4 in accordance with some embodiments. In particular, the edge primitives along a left edge 454 and a top edge 455 are illustrated in gray. Internal primitives are primitives located inside the edges of the patch 240. FIG. 5 illustrates the internal primitives for the patch 240 in accordance with some embodiments. The internal primitives are illustrated with a gray fill (e.g., internal primitive 556). As is known by one skilled in the art, in some cases, such as for some graphics APIs, the edge primitives are tessellated differently than the internal primitives of a patch. For example, in some cases the edge primitives of the patch 240 are tessellated by the tessellators 135 using different tessellation factors, a different tessellation process, or a combination thereof, than the internal primitives of the patch 240. Accordingly, the sub-patch distributor 132 groups the edge primitives of the patch 240 in different sub-patch groups than the internal primitives, using a different grouping process.

To group the edge primitives, the sub-patch distributor 132 selects a first edge of the patch 240 (e.g., edge 454) and adds the primitives of the selected edge to a sub-patch group. The sub-patch distributor 132 then determines if adding all primitives of a next edge of the patch 240 (e.g., edge 455) to the sub-patch group would result in the number of primitives in the sub-patch group exceeding the primitive limit 138. If so, the sub-patch distributor sends the sub-patch group to one of the tessellators 135 for tessellation and adds the primitives of the next edge of the patch 240 to a new sub-patch group. If adding all the primitives of the next edge would not result in the number of primitives of the sub-patch group exceeding the primitive limit 138, the sub-patch distributor 132 adds all the primitives for the next edge of the patch 240 to the current sub-patch group.

The sub-patch distributor 132 continues to add edge primitives of successive edges of the patch 240 until adding all the edge primitives of a next edge would result in the current sub-patch group exceeding the primitive limit 138. The sub-patch distributor 132 then sends the current group to one of the tessellators 135 and begins creating a new sub-patch group. The sub-patch distributor 132 repeats this process until all edge primitives for all edges of the patch 240 have been placed in a sub-patch group and sent to one of the tessellators 135.

Further, the sub-patch distributor 132 sends the sub-patch groups to the tessellators 135 in round-robin fashion. For example, the sub-patch distributor 132 sends a first sub-patch group of edge primitives to the tessellator 236, the next sub-patch group of edge primitives to the tessellator 237, the following group of edge primitives to the tessellator 237, and so on. The different sub-patch groups of edge primitives are thus distributed among the tessellators 135. Further, by limiting the size of the sub-patch groups of edge primitives to the primitive limit 138, in many cases most or all of the resulting sub-patch groups are of similar size (that is, include the same or similar number of edge primitives). The tessellation workload for the edge primitives of the patch 240 is thus distributed among the tessellators 135 relatively evenly, improving tessellation efficiency.

Figure 6:
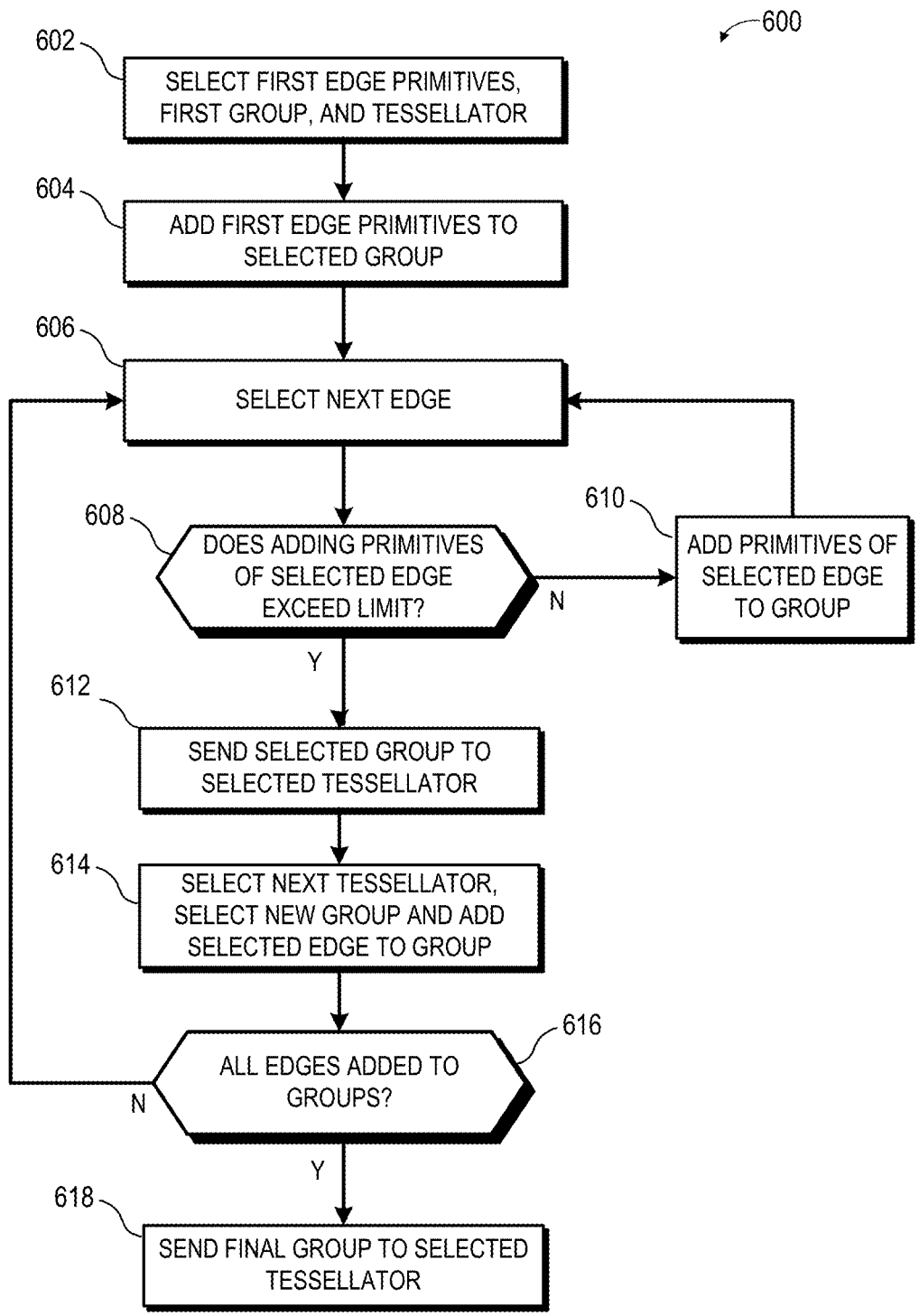
FIG. 6 is a flow diagram illustrating a method of distributing edge primitives of an input patch among sub-patch groups for tessellation in accordance with some embodiments.

FIG. 6 illustrates a flow diagram of a method 600 of distributing edge primitives of a received input patch among different sub-patch groups for tessellation. The method 700 is described with respect to an example implementation at the GPU 102 of FIG. 1. At block 602, the sub-patch distributor 132 selects a first edge of the patch 240 and a first sub-patch group, which is initially empty (i.e. does not include any primitives of the patch 240). At block 604 the sub-patch distributor adds all the edge primitives of the selected edge to the selected sub-patch group.

At block 606, the sub-patch distributor 132 selects the next edge of the patch 240 according to a specified selection criteria, such as a specified direction. For example, in some embodiments the sub-patch distributor 132 proceeds in a clockwise fashion, and therefore selects the next edge connected to the currently selected edge in the clockwise direction. In other embodiments, the sub-patch distributor 132 proceeds in a different direction, such as a counterclockwise direction. At block 608, the sub-patch distributor 132 determines if adding all of the edge primitives of the currently selected edge (that is, the edge selected at block 606) to the currently selected group would result in the number of edge primitives in the currently selected group exceeding the primitive limit 138. If not, the method flow moves to block 610 and the sub-patch distributor 132 adds the edge primitives of the currently selected edge to the currently selected group. The method flow returns to block 606 and the sub-patch distributor selects the next edge.

Returning to block 608, in response to the sub-patch distributor determining that adding all of the edge primitives of the currently selected edge would result in the currently selected sub-patch group exceeding the primitive limit 138, the method flow moves to block 612 and the sub-patch distributor 132 sends the current sub-patch group to the currently selected one of the tessellators 135. The method flow proceeds to block 614 and the sub-patch distributor 132 selects a next one of the tessellators 135 according a specified selection sequence. In addition, the sub-patch distributor creates and selects a new sub-patch group and adds the currently selected edge (that is, the edge selected at block 606) to the new sub-patch group.

At block 616, the sub-patch distributor 132 determines if all edge primitives of the patch 240 have been added to a sub-patch group. If not, the method flow returns to block 606. If all edge primitives of the patch 240 have been added to a sub-patch group, the method flow moves to block 618 and the sub-patch distributor 132 sends the final sub-patch group for the edges of the patch 240 to the selected one of the tessellators 135.

Figure 7:
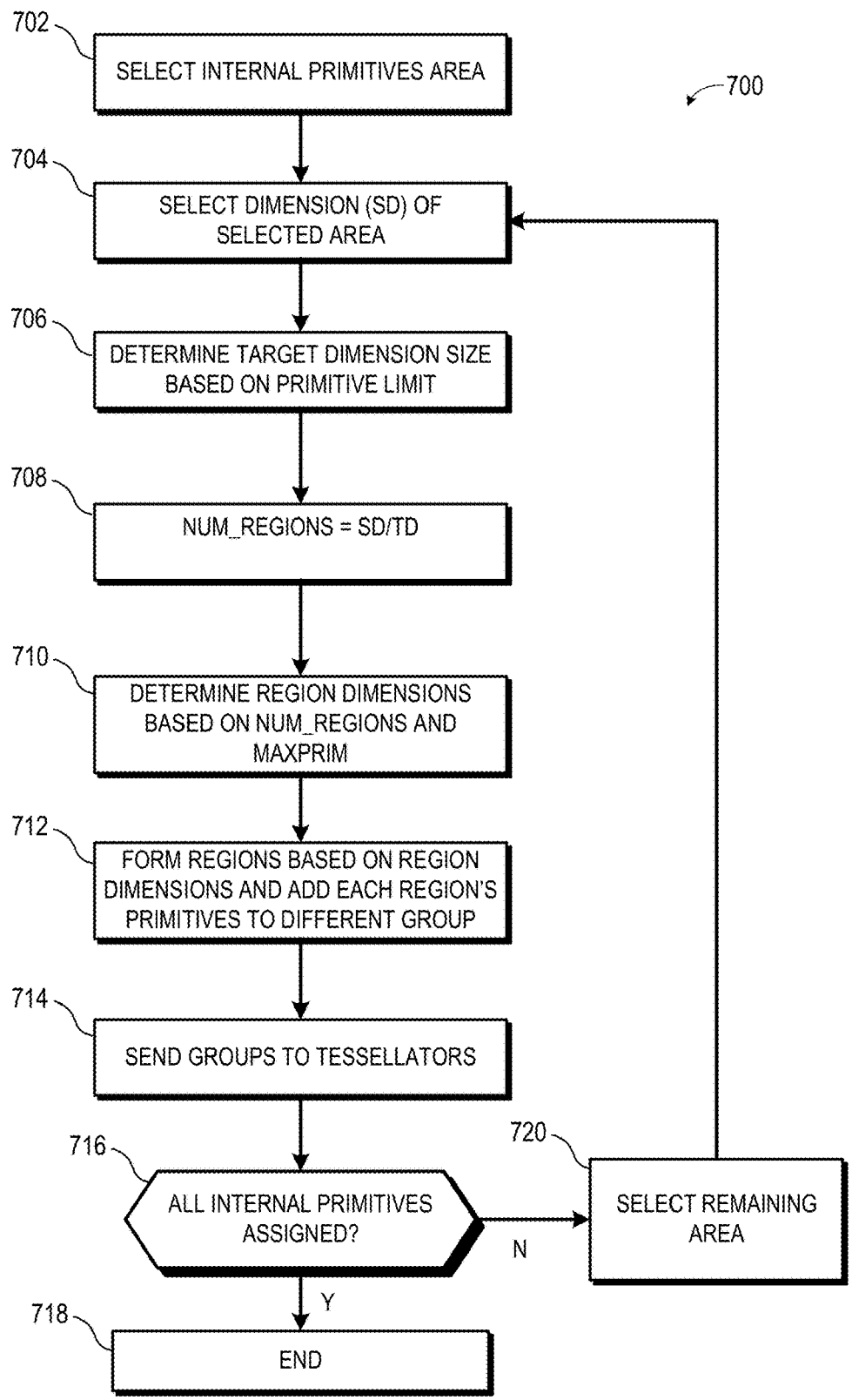
FIG. 7 is a flow diagram illustrating a method of distributing internal primitives of an input patch among sub-patch groups for tessellation in accordance with some embodiments.
Figure 8:
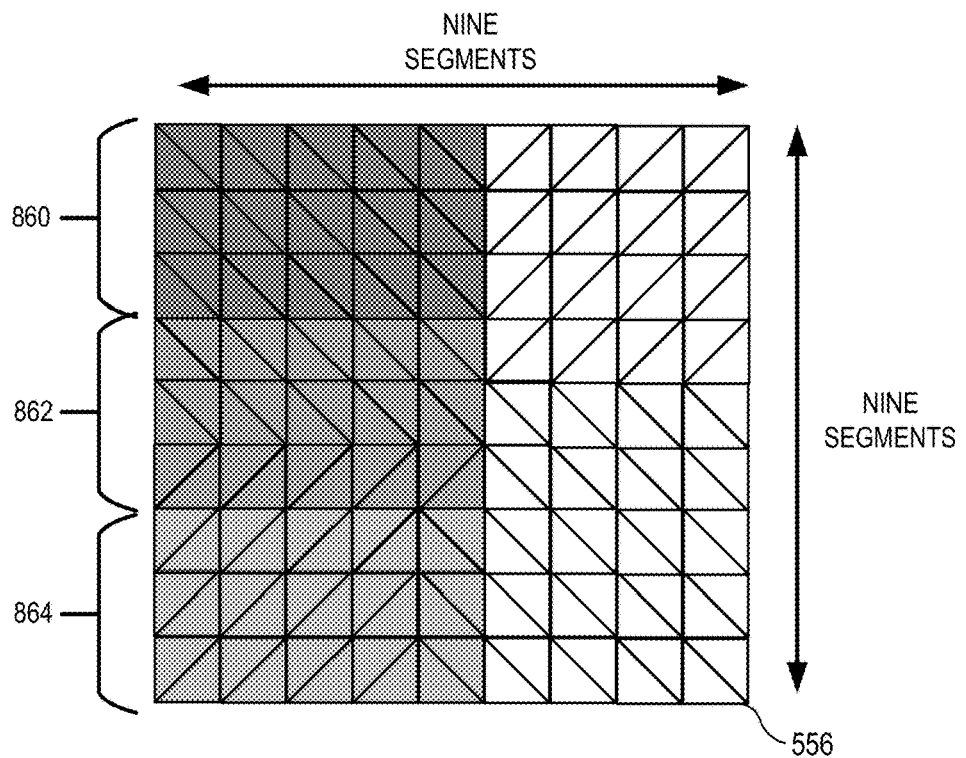
FIG. 8 is a diagram illustrating an example of distributing internal primitives of an input patch among sub-patch groups for tessellation in accordance with some embodiments.

FIG. 7 illustrates a block diagram of a method 700 of grouping sub-patches of internal primitives of an input patch for tessellation in accordance with some embodiments. The method 700 is described with respect to an example implementation at the GPU 100 of FIG. 1 and is further described with respect to an example implementation illustrated at FIGS. 8-10 in accordance with some embodiments. At block 702, the sub-patch distributor 132 selects all the internal primitives of the input patch 240 and determines the dimensions of the internal primitives (e.g., the length and width of the internal primitives). In some embodiments the sub-patch distributor 132 identifies the dimensions by identifying regular segments of the internal primitives and identifying the number of segments along each dimension. An example is illustrated at FIG. 8 in accordance with some embodiments. In particular, FIG. 8 illustrates the internal primitives 556 of the patch 240. As illustrated, the internal primitives 556 form a regular pattern of squares. The sub-patch distributor 132 identifies each square as a segment, and further identifies that the length of the internal primitives 556 is nine segments and the width of the internal primitives is also nine segments.

Returning to FIG. 7 and the method 700, at block 704 the sub-patch distributor 132 identifies the number of segments along a selected dimension of the internal primitives 556, such as the shorter dimension. In this case, the width and the height are the same, and the sub-patch distributor 132 therefore picks a specified one of the two dimensions. For purposes of description with respect to the internal primitives 556, it is assumed that the sub-patch distributor 132 selects the length of the internal primitives 556. The sub-patch distributor 132 then sets a selected dimension (SD) value to the number of segments of the identified dimension. Thus, for the internal primitives 556, the sub-patch distributor sets the SD value to nine segments based on the length of the internal primitives 556, as illustrated at FIG. 8.

At block 706, the sub-patch distributor 132 determines a target dimension size based on the specified primitive limit 138. In some embodiments, the sub-patch distributor 132 determines the target dimension size according to the following formula:

$$TD = \sqrt{\frac{PrimLimit}{2}}$$

where TD is the target dimension size and PrimLimit is the specified primitive limit 138. For purposes of the example of FIG. 8, it is assumed that the specified primitive limit 138 is 32 primitives, resulting in a TD value of 4.

At block 708, the sub-patch distributor 132 identifies a target number of regions along the selected dimension, designated Num_Regions, by dividing the number of segments of the selected dimension, as identified at block 704, with the TD value determined at block 706, and rounding any fraction up. Thus, for the example of FIG. 8, the #Regions value is 9 divided by 4, with the resulting value of 2.25 rounded up to 3. The #Regions determines the number of regions for the initial division of the internal primitives 556 along the length of the internal primitives 556. As described further below, the primitives of each region are to be placed into different sub-patch groups for tessellation.

At block 710, the sub-patch distributor 132 determines the dimensions for each region based on the #Regions value and the specified primitive limit 138. In some embodiments, the sub-patch distributor 132 determines the region dimension for the SD dimension (identified at block 704) according to the following formula:

$$DS_{SD} = \frac{SD}{\#Regions}$$

where $DS_{SD}$ is the region dimension size along the selected dimension. Thus, for the example of FIG. 8 and the internal primitives 556, the length of each region is 9 (the SD value) divided by 3 (the #Regions), so each region is to have a length of 3. For the other dimension, the size for each region is determined according to the following formula:

$$DS_{ND} = \frac{PrimLimit}{2*DS_{SD}}$$

where $DS_{ND}$ is the region dimension size along the non-selected dimension (e.g., the longer dimension). In some embodiments, any fractional $DS_{ND}$ value is rounded down. Thus, for the example of FIG. 8, the $DS_{ND}$ value is 16 (the specified primitive limit of 32 divided by two) divided by 3, resulting in a value of 5.33 rounded down to 5. Thus, each region of the initial division is to have a width of 5.

At block 712, the sub-patch distributor 132 forms regions of the internal primitives 556 having the dimensions $DS_{SD}$ (along the shortest dimension of the internal primitives 556) and $DS_{ND}$ (along the other dimension of the internal primitives 556). Thus, for the example of FIG. 8, the sub-patch distributor 132 forms three regions, designated regions 860, 862, and 864, each having a length of 3 segments and a width of 5 segments. In some embodiments, the sub-patch distributor 132 forms the regions by beginning at a specified corner of the internal primitives 556 (e.g., the lower left corner) and proceeding to place segments in a region along each dimension until reaching the $DS_{SD}$ and $DS_{ND}$ limits for the respective dimensions, thus forming a first region. The sub-patch distributor 132 then forms the next region by selecting a segment that shares an edge with the first region along the shorter dimension of the internal primitives 556. The sub-patch distributor forms a second region, beginning at the selected corner, in similar fashion to the first, and continues to form additional regions in a similar fashion until the target number of regions (the #Regions) has been reached.

After forming the regions, the sub-patch distributor 132 assigns the primitives for each region to a different sub-patch group. At block 714, the sub-patch distributor 132 sends the different sub-patch groups to the tessellators 135. In some embodiments, the sub-patch distributor 132 distributes the different sub-patch groups as much as possible among different ones of the tessellators 135, thereby balancing the tessellation workload.

At block 716, the sub-patch distributor 132 determines if all of the internal primitives 556 of the patch 240 have been assigned to a sub-patch group. If so, the method proceeds to block 718 and the method ends. If at block 716 there are still internal primitives remaining that have not been assigned to a sub-patch group, the method flow moves to block 720 and the sub-patch distributor 132 selects the remaining area of the internal primitives 556. That is the sub-patch distributor 132 selects the area formed by the internal primitives that have not yet been assigned to a sub-patch group. The method returns to block 704 and the sub-patch distributor 132 forms regions out of the remaining area in similar fashion to that described above.

Figure 9:
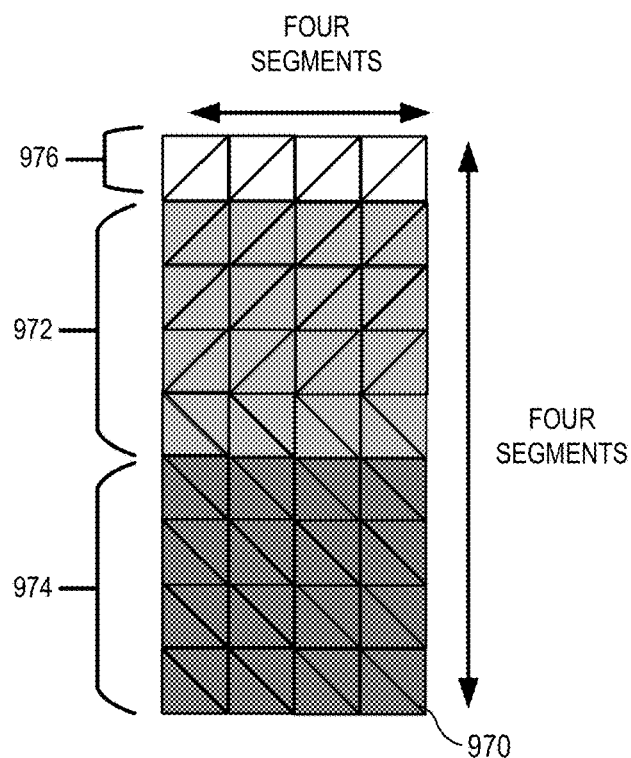
FIG. 9 is a diagram illustrating another example of distributing internal primitives of an input patch among sub-patch groups for tessellation in accordance with some embodiments.

FIG. 9 illustrates another iteration of the method 700 on the internal primitives 556 in accordance with some embodiments. FIG. 9 illustrates internal primitives 970 of the patch 240. The internal primitives 970 form the remaining area after the sub-patch distributor 132 has formed the regions 862, 864, and 866 of FIG. 8. For the primitives 970, at block 704 the sub-patch distributor 132 determines that the selected shortest dimension is the width of the area, at 4 segments (versus 9 segments for the length). At block 706, the sub-patch distributor 132 determines a target dimension (TD) value of 4, and at block 708 the sub-patch distributor 132 determines the #Regions value to be 1. That is, the remaining area is to be divided such that each region is the entire width of the remaining area.

At block 710, the sub-patch distributor determines the region dimensions for the regions to be formed to be a length of 4 and a width of 4. Accordingly, at block 712 the sub-patch distributor forms two 4 by 4 regions of the internal primitives 970, illustrated at FIG. 9 as regions 972 and 974. The sub-patch distributor 132 places the internal primitives for each region into a different sub-patch group and, at block 714 sends the sub-patch groups to the tessellators 135. In some embodiments, the sub-patch distributor 132 distributes the sub-patch groups among the tessellators for this second iteration of region formation based on how the sub-patch groups were distributed for the previous iteration. For example, in some embodiments the sub-patch distributor 132 distributes the sub-patch groups corresponding to regions 860, 862, and 864 to the tessellators 236, 237, and 238 respectively. Thus, for the first iteration of the method 700, tessellator 239 is not assigned a sub-patch group. Accordingly, for the second iteration of the method 700, at block 714 the sub-patch distributor 132 sends the sub-patch group corresponding to region 972 to the tessellator 239 and the sub-patch group corresponding to the tessellator 236.

After forming the regions 972 and 974, the sub-patch distributor 132 determines at block 720 that the patch 240 includes a remaining area of primitives 976 (FIG. 9). Accordingly, the sub-patch distributor repeats the method 700 for the primitives 976, thereby distributing all primitives of the patch 240 for tessellation.

Figure 10:
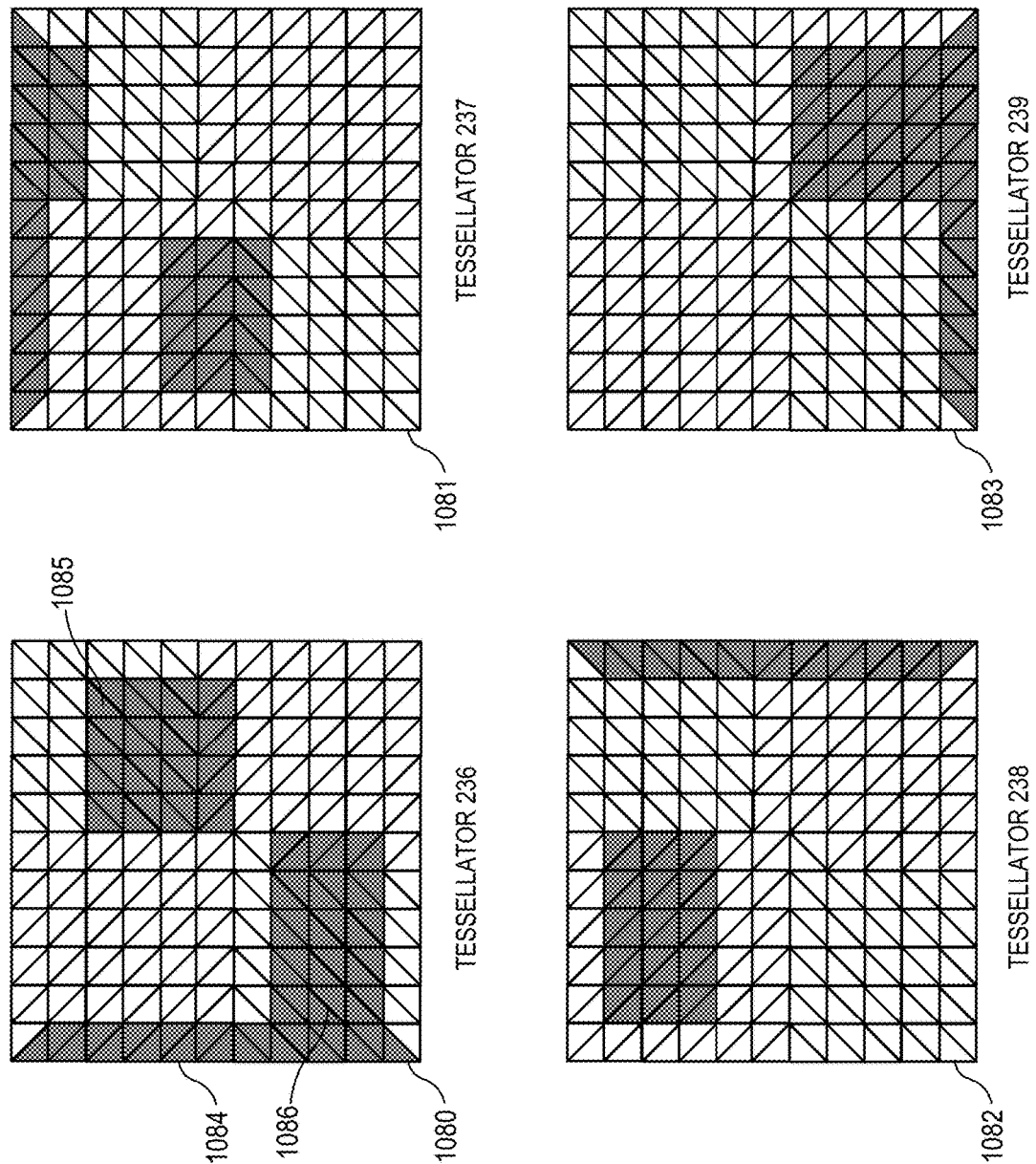
FIG. 10 is a diagram illustrating an example distribution of sub-patch groups of an input patch in accordance with some embodiments.

FIG. 10 illustrates the distribution of primitives of the patch 240 to the tessellators 135 in accordance with some embodiments. In particular, FIG. 10 illustrates a number of different views of the patch 240, designated views 1080, 1081, 1082 and 1083. Each view depicts, with gray fill, the primitives of the patch 240 that are sent by the sub-patch distributor 132 to a corresponding one of the tessellators 135 after application of the methods 600 (FIG. 6) and 700 (FIG. 7) to the patch 240. In particular, view 1080 depicts the primitives provided to the tessellator 236, view 1081 depicts the primitives provided to the tessellator 237, view 1082 depicts the primitives provided to the tessellator 238, and view 1083 depicts the primitives provided to the tessellator 239.

In some cases, the primitives are provided to the corresponding tessellator in multiple groups. For example, view 1081 depicts a set of edge primitives 1084, a set of internal primitives 1085, and a different set of internal primitives 1086. In some embodiments, the sub-patch distributor 132 provides the set 1084 to the tessellator 236 via one sub-patch group, the set 1085 to the tessellator 236 via another sub-patch group, and the set 1086 to the tessellator 236 via still another sub-patch group. As depicted by the views 1080-1083, by dividing the patch 240 into different regions based on the specified primitive limit 138, placing primitives of the different regions into different sub-patch groups, and providing the different sub-patch groups to corresponding ones of the tessellators 135, the primitives of the patch 240 are distributed relatively evenly among the tessellators 135. That is, the tessellation workload for the patch 240 is shared among the tessellators 135, supporting more efficient use of each tessellator and improving overall efficiency of the GPU 102.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    dividing, at a graphics processing unit (GPU) a received image patch into a plurality of sub-patch groups based on a specified limit of primitives; and
    distributing each sub-patch group of the plurality of sub-patch groups to a different tessellator of a plurality of tessellators of the GPU for tessellation.

2. The method of claim 1, wherein dividing the received image patch comprises:
    identifying a first area of the received image patch;
    dividing the first area into a first plurality of regions, each having a first number of primitives; and
    placing primitives for each of the first plurality of regions into different corresponding ones of the plurality of sub-patch groups.

3. The method of claim 2, wherein dividing the received image patch comprises:
    identifying a second area of the received image patch, the second area different from the first area;
    dividing the second area into a second plurality of regions, each having a second number of primitives; and
    placing primitives for each of the second plurality of regions into different corresponding ones of the plurality of sub-patch groups.

4. The method of claim 3, wherein the first number of primitives is different than the second number of primitives.

5. The method of claim 2, wherein the first area includes a plurality of internal primitives of the received image patch.

6. The method of claim 2, wherein dividing the first area comprises:
    dividing the first area to maintain the first number of primitives at or below the specified limit of primitives.

7. The method of claim 2, wherein dividing the first area comprises:
    determining a number of regions based on the specified limit of primitives;
    determining a first size of each of the first plurality of regions along a first dimension based on the number of regions; and
    dividing the first area into the first plurality of regions based on the first size.

8. The method of claim 7, wherein dividing the first area comprises:
    determining a second size of each of the first plurality of regions along a second dimension based on the specified limit of primitives; and
    dividing the first area into the first plurality of regions based on the second size.

9. The method of claim 1, wherein dividing the received image patch comprises:
    identifying a first sum by adding a first number of primitives to be generated for a first edge of the received image patch and a second number of primitives to be generated for a second edge of the received image patch; and
    placing primitives of the first edge into a first sub-patch group and primitives of the second edge into a second sub-patch group in response to the first sum exceeding the specified limit of primitives.

10. The method of claim 9, wherein dividing the received image patch comprises:
    in response to the first sum being less than the specified limit of primitives, placing primitives of the first edge of the received image patch and primitives of the second edge of the received image patch in a same sub-patch group.

11. A method, comprising:
    dividing a received image patch into a plurality of sub-patch groups by:
        identifying a first area of the received image patch;

dividing the first area into a first plurality of regions, each region having a number of primitives less than or equal to a specified limit of primitives; and placing primitives for each of the first plurality of regions into a plurality of sub-patch groups; and distributing each sub-patch group of the plurality of sub-patch groups to a different tessellator of a plurality of tessellators of a graphics processing unit for tessellation.

12. A graphics processing unit (GPU) comprising:

a plurality of compute units to implement a tessellation stage of a graphics pipeline, the tessellation stage comprising:

a plurality of tessellators; and a sub-patch distributor to:

divide a received image patch into a plurality of sub-patch groups, each including a number of primitives based on a specified limit of primitives; and distribute each sub-patch group of the plurality of sub-patch groups to a different tessellator of the plurality of tessellators for tessellation.

13. The GPU of claim 12, wherein the sub-patch distributor is to divide the received image patch by:

identifying a first area of the received image patch;

dividing the first area into a first plurality of regions, each having a first number of primitives; and placing primitives for each of the first plurality of regions into different corresponding ones of the plurality of sub-patch groups.

14. The GPU of claim 13, wherein the sub-patch distributor is to divide the received image patch by:

identifying a second area of the received image patch;

dividing the second area into a second plurality of regions, each having a second number of primitives; and placing primitives for each of the second plurality of regions into different corresponding ones of the plurality of sub-patch groups.

15. The GPU of claim 14, wherein the first number of primitives is different than the second number of primitives.

16. The GPU of claim 13, wherein the first area includes a plurality of internal primitives of the received image patch.

17. The GPU of claim 13, wherein the sub-patch distributor is to divide the received image patch by:

dividing the first area to maintain the first number of primitives at or below the specified limit of primitives.

18. The GPU of claim 13, wherein the sub-patch distributor is to divide the received image patch by:

determining a number of regions based on the specified limit of primitives;

determining a first size of each of the first plurality of regions along a first dimension based on the number of regions; and dividing the first area into the first plurality of regions based on the first size.

19. The GPU of claim 18, wherein the sub-patch distributor is to divide the first area by:

determining a second size of each of the first plurality of regions along a second dimension based on the specified limit of primitives; and dividing the first area into the first plurality of regions based on the second size.

20. The GPU of claim 12, wherein the sub-patch distributor is to divide the received image patch further by:

identifying a first sum by adding a first number of primitives to be generated for a first edge of the received image patch and a second number of primitives to be generated for a second edge of the received image patch; and placing primitives of the first edge into a first sub-patch group and primitives of the second edge into a second sub-patch group in response to the first sum exceeding the specified limit of primitives.

21. A system, comprising:

a memory configured to store data for a graphics pipeline; and a processing unit coupled to the memory and configured to implement at least a portion of the graphics pipeline, the processing unit configured to:

divide a received image patch into a plurality of sub-patch groups, each including a number of primitives based on a specified limit of primitives; and distribute each sub-patch group of the plurality of sub-patch groups to a different tessellator of a plurality of tessellators for tessellation.

22. The system of claim 21, wherein the processing unit is further configured to:

identify a first area of the received image patch;

divide the first area into a first plurality of regions, each having a first number of primitives; and place primitives for each of the first plurality of regions into different corresponding ones of the plurality of sub-patch groups.

23. The system of claim 22, wherein the processing unit is further configured to:

identify a second area of the received image patch;

divide the second area into a second plurality of regions, each having a second number of primitives; and place primitives for each of the second plurality of regions into different corresponding ones of the plurality of sub-patch groups.

24. The system of claim 22, wherein the first area includes a plurality of internal primitives of the received image patch.

25. The system of claim 22, wherein the processing unit is further configured to:

determine a number of regions based on the specified limit of primitives;

determine a first size of each of the first plurality of regions along a first dimension based on the number of regions; and divide the first area into the first plurality of regions based on the first size.

26. The system of claim 21, further comprising a second processing unit configured to execute a graphics driver and provide one or more commands to the processing unit based on the graphics driver.

27. The system of claim 26, wherein the one or more commands indicate the specified limit of primitives.

\* \* \* \* \*